(12) United States Patent
Numajiri

(10) Patent No.: US 8,164,211 B2
(45) Date of Patent: Apr. 24, 2012

(54) WIND TURBINE GENERATOR

(75) Inventor: Tomohiro Numajiri, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 405 days.

(21) Appl. No.: 12/312,600

(22) PCT Filed: Jun. 10, 2008

(86) PCT No.: PCT/JP2008/060593
§ 371 (c)(1), (2), (4) Date: Jun. 11, 2009

(87) PCT Pub. No.: WO2009/150716
PCT Pub. Date: Dec. 17, 2009

(65) Prior Publication Data
US 2011/0031755 A1  Feb. 10, 2011

(51) Int. Cl.
F03D 9/00 (2006.01)
(52) U.S. Cl. .................... 290/55; 416/244 R
(58) Field of Classification Search ............ 290/43, 290/44, 54, 55; 416/244 R, 61
See application file for complete search history.

(56) References Cited

U.S. PATENT DOCUMENTS

| | | | | |
|---|---|---|---|---|
| 5,140,856 A * | 8/1992 | Larsen | | 73/455 |
| 7,282,808 B2 * | 10/2007 | Shibata et al. | | 290/55 |
| 7,431,567 B1 * | 10/2008 | Bevington et al. | | 416/244 R |
| 7,745,951 B2 * | 6/2010 | Numajiri et al. | | 290/55 |
| 7,762,771 B2 * | 7/2010 | Nies | | 416/43 |
| 7,905,707 B2 * | 3/2011 | Numajiri et al. | | 416/155 |
| 2003/0039419 A1 | 2/2003 | Wobben | | |
| 2011/0012360 A1 * | 1/2011 | Numajiri | | 290/55 |
| 2011/0095537 A1 * | 4/2011 | Numajiri | | 290/55 |
| 2011/0233939 A1 * | 9/2011 | Noda et al. | | 290/55 |
| 2011/0254281 A1 * | 10/2011 | Noda et al. | | 290/55 |
| 2011/0309620 A1 * | 12/2011 | Fujino et al. | | 290/44 |

FOREIGN PATENT DOCUMENTS

| | | |
|---|---|---|
| DE | 10 2005 001 344 A1 | 7/2006 |
| EP | 1406012 | 4/2004 |
| EP | 1 571 334 A1 | 9/2005 |
| JP | 2007-051585 | 3/2007 |

* cited by examiner

*Primary Examiner* — Nicholas Ponomarenko
(74) *Attorney, Agent, or Firm* — Manabu Kanesaka; Kenneth M. Berner; Benjamin J. Hauptman

(57) ABSTRACT

A wind-driven generator whose yaw system (10A) installed at the upper part of a support (2) is reduced in the number of its components and weight. The wind-driven generator has the yaw system (10A) equipped with a yaw driving device (30), a yaw slewing ring, and a yaw brake and slewing a nacelle installed at the upper part of the support (2) according to the direction of the wind. A yaw slewing ring fixed to a nacelle table plate (12) through a bracket (23A) having a nearly L-shaped cross section functions as the slide bearing (20A). Thus, the slide bearing (20A) slidably supports a flange part (2a) formed at the upper end of the support (2) with slide pads (22) held by the bracket (23A).

3 Claims, 3 Drawing Sheets

WIND TURBINE GENERATOR

TECHNICAL FIELD

The present invention relates to a wind turbine generator equipped with a yaw system that rotates a nacelle (wind-turbine main body) in accordance with the wind direction.

BACKGROUND ART

A conventional wind turbine generator that generates electricity by rotating a wind turbine with wind power and transmitting its rotary motion to a generator is provided with a yaw system that rotates (swings) a nacelle in accordance with the wind direction.

The conventional yaw system is constituted of a yaw driving unit, a yaw slew ring, and a yaw brake, whose main components are disposed at the nacelle side. That is, the nacelle fitted with a wind turbine and a powertrain that generates electricity using its rotational power is configured to rotate on the top of a tower by the operation of the yaw system and to generate electricity while pointing in an optimum direction according to the wind direction.

A conventional yaw system 10 shown in FIG. 3 is configured such that a nacelle is rotatably mounted to a tower 2, which is a fixed side, via a yaw slew ring 11 using a slide bearing 20 that also serves as a yaw brake. Reference numeral 12 in the drawing denotes a nacelle base plate that constitutes the nacelle, and the nacelle base plate 12 is tightly fitted with a yaw driving unit 15 equipped with an electric motor 13 and a drive gear 14.

The above-described slide bearing 20 is constituted of a fixed washer 21 fixed to a flange 2a of the tower 2 and a bracket 23 that holds brake pads 22. The bracket 23 in this case is a substantially L-shaped cross-section member, whose upper end surface is fixed to the lower surface of the nacelle base plate 12.

The thus-configured slide bearing 20 supports the brake pads 22 so that they can slide on the upper and lower surfaces and the outer circumferential surface of a collar 21a provided at the fixed washer 21.

In this case, a configuration example is shown in which the yaw driving unit 15 is disposed outside the tower 2, since reference sign CL in the drawing designates the axial center line of the tower 2.

Since the drive gear 14 engages with a ring gear 16 at the fixed side, the yaw driving unit 15 can rotate the nacelle (the nacelle base plate 12, the bracket 23, etc.) at the moving side, together with the drive gear 14, in accordance with the rotation of the electric motor 13 (for example, refer to Patent Document 1).

In the conventional wind turbine generator, a yaw system that adopts a rolling bearing as the above-described yaw slew ring is also known.

Patent Document 1: Japanese Unexamined Patent Application, Publication No. 2007-51585

DISCLOSURE OF INVENTION

In recent years, wind turbine generators have tended to become larger (generate higher output), and the weights of the nacelle and the yaw system mounted on the top of the tower are also increasing with the increasing size of the wind turbine generators.

The above-described configuration of the related art adopts the slide bearing that functions as the yaw slew ring that also functions as a yaw brake between the tower and the nacelle. Accordingly, the tower, the yaw slew ring (bearing) structure, and the nacelle are individually configured as separate structures, which makes it difficult to reduce the number of components to achieve weight reduction.

Against such a backdrop, it is desired to reduce the number of components that constitute the yaw system and the weight thereof.

The present invention is made in consideration of the above-described circumstances, and it is an object thereof to provide a wind turbine generator in which the number of components and weight of the yaw system mounted atop the tower can be reduced.

The present invention adopts the following solutions to solve the above-described problems.

A wind turbine generator according to the present invention is a wind turbine generator that is equipped with a yaw system including a yaw driving unit, a yaw slew ring, and a yaw brake and that rotates a nacelle mounted on the top of a tower in accordance with the wind direction, wherein the yaw slew ring is a slide bearing fixed to the lower surface of the nacelle with a substantially L-shaped-cross-section bracket; and the slide bearing is configured to slidably support a flange formed at the upper end of the tower with slide pads held by the bracket.

With such a wind turbine generator, the yaw slew ring is a slide bearing fixed to the lower surface of the nacelle with a substantially L-shaped-cross-section bracket; and the slide bearing is configured to slidably support a flange formed at the upper end of the tower with slide pads held by the bracket. Therefore, the slide bearing can be configured by effectively using the flange. Thus, the slide bearing serves as the yaw slew ring that also has the function of the yaw brake.

In the above-described invention, it is preferable that the bracket be divided into a plurality of portions in the circumferential direction. This makes it easy to mount the bracket on the upper end of the tower.

In this case, it is preferable to include a temporary fixing member that temporarily holds the bracket at the upper end of the tower. This allows works such as transportation to be performed while maintaining a state in which the bracket is temporarily held at the upper end of the tower until the nacelle is mounted to a predetermined position.

According to the above-described present invention, since the slide bearing is configured by effectively using the flange formed at the upper end of the tower, weight reduction can be achieved by reducing the number of components of the slide bearing itself. Furthermore, since the slide bearing functions as the yaw slew ring that serves also as the yaw brake, a wind turbine generator can be provided in which the number of components can be reduced also for the entire yaw system that is mounted atop the tower and that rotates the nacelle, thus allowing weight reduction.

EXPLANATION OF REFERENCE SIGNS

Figure 1:
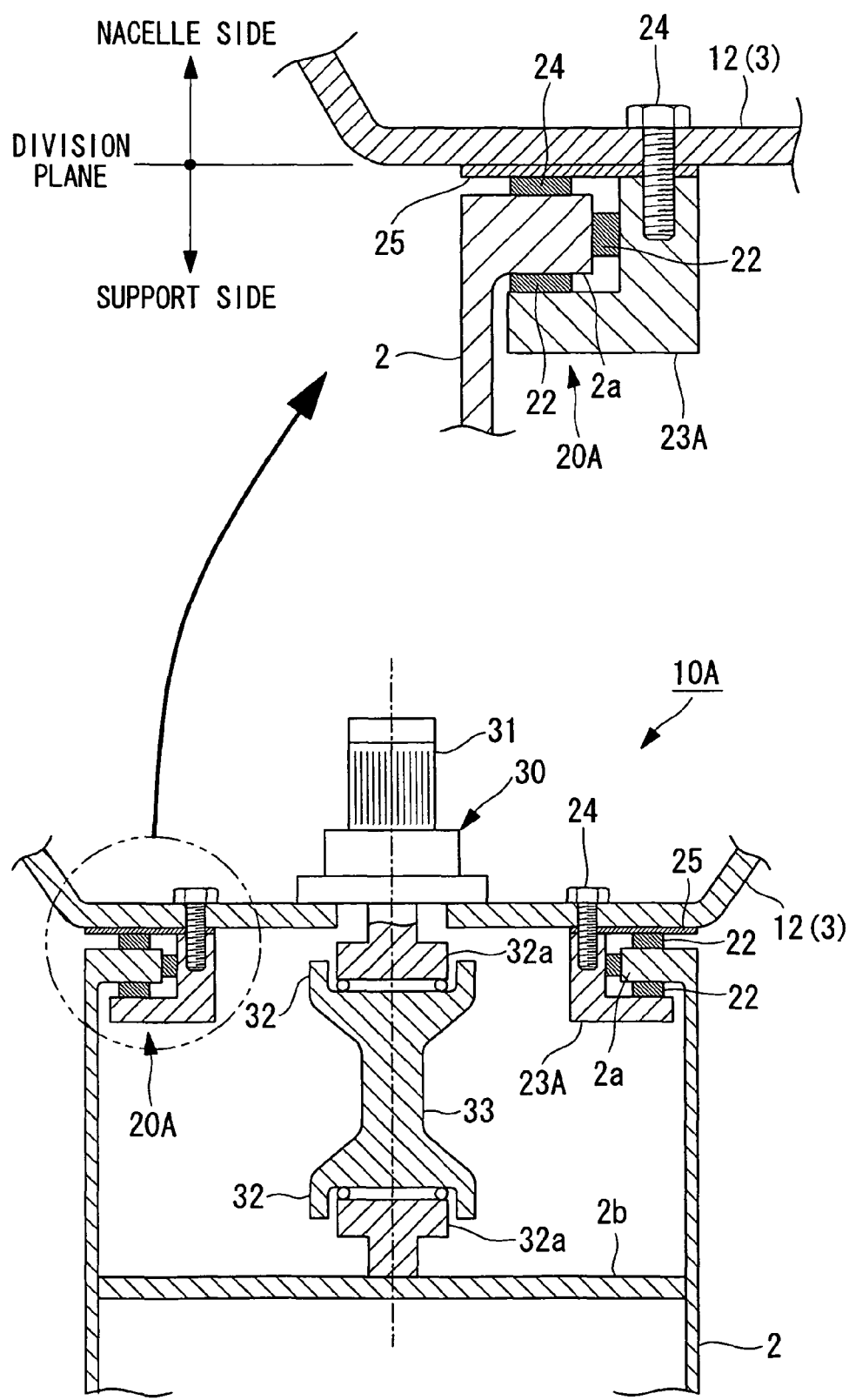
FIG. 1 is a cross-sectional view of relevant parts, showing an example of the configuration of the upper part of a tower and a yaw system as an embodiment of a wind turbine generator according to the present invention.

1: wind turbine generator
2: tower
2a: flange
3: nacelle
4: rotor head
10A: yaw system
12: nacelle base plate
20A: slide bearing
22: slide pad
23A: bracket
30: yaw driving unit

BEST MODE FOR CARRYING OUT THE INVENTION

An embodiment of a wind turbine generator according to the present invention will be described hereinbelow with reference to FIG. 1 and FIG. 2.

Figure 2:
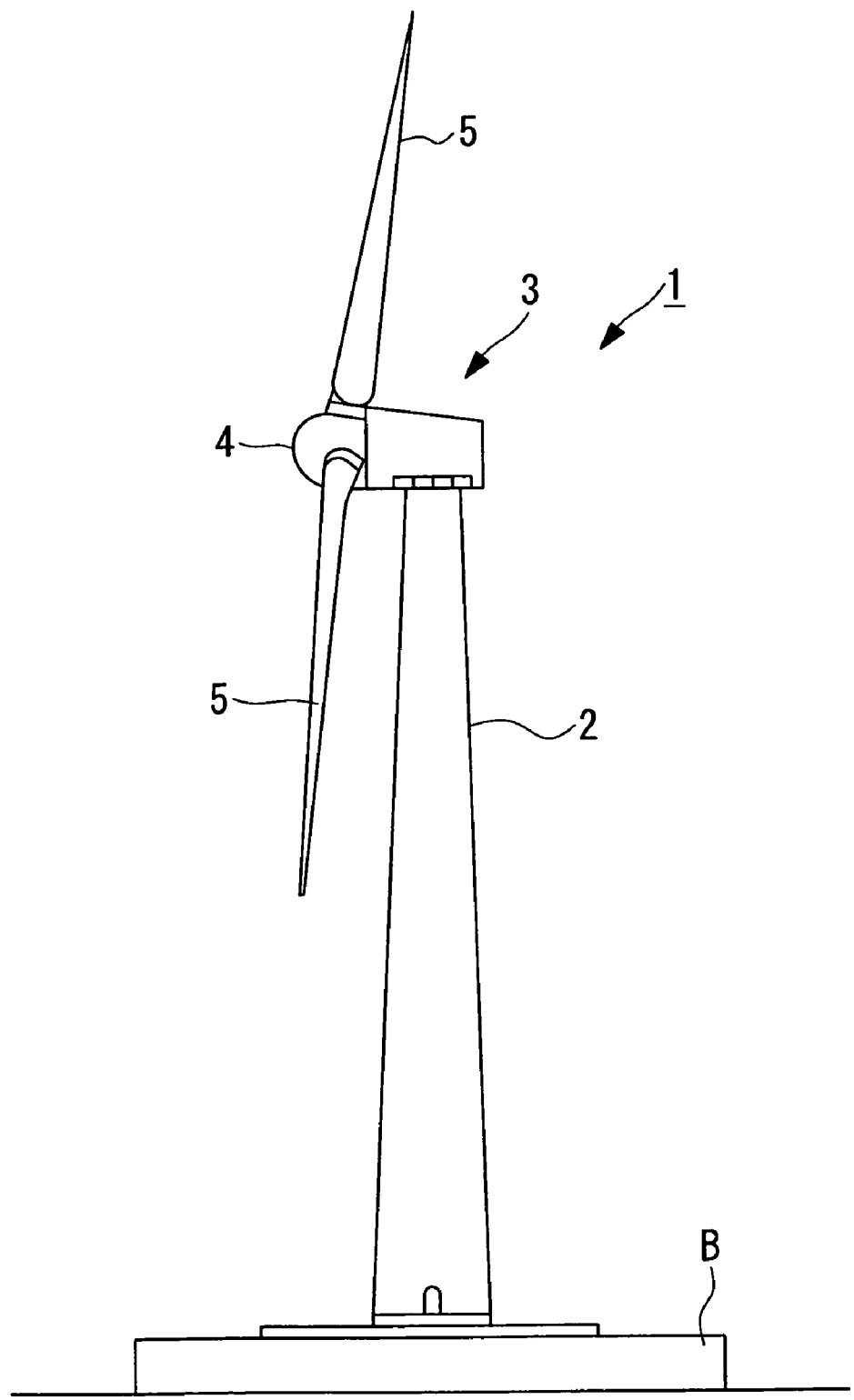
FIG. 2 is a diagram showing an example of the overall configuration of the wind turbine generator according to the present invention.
Figure 3:
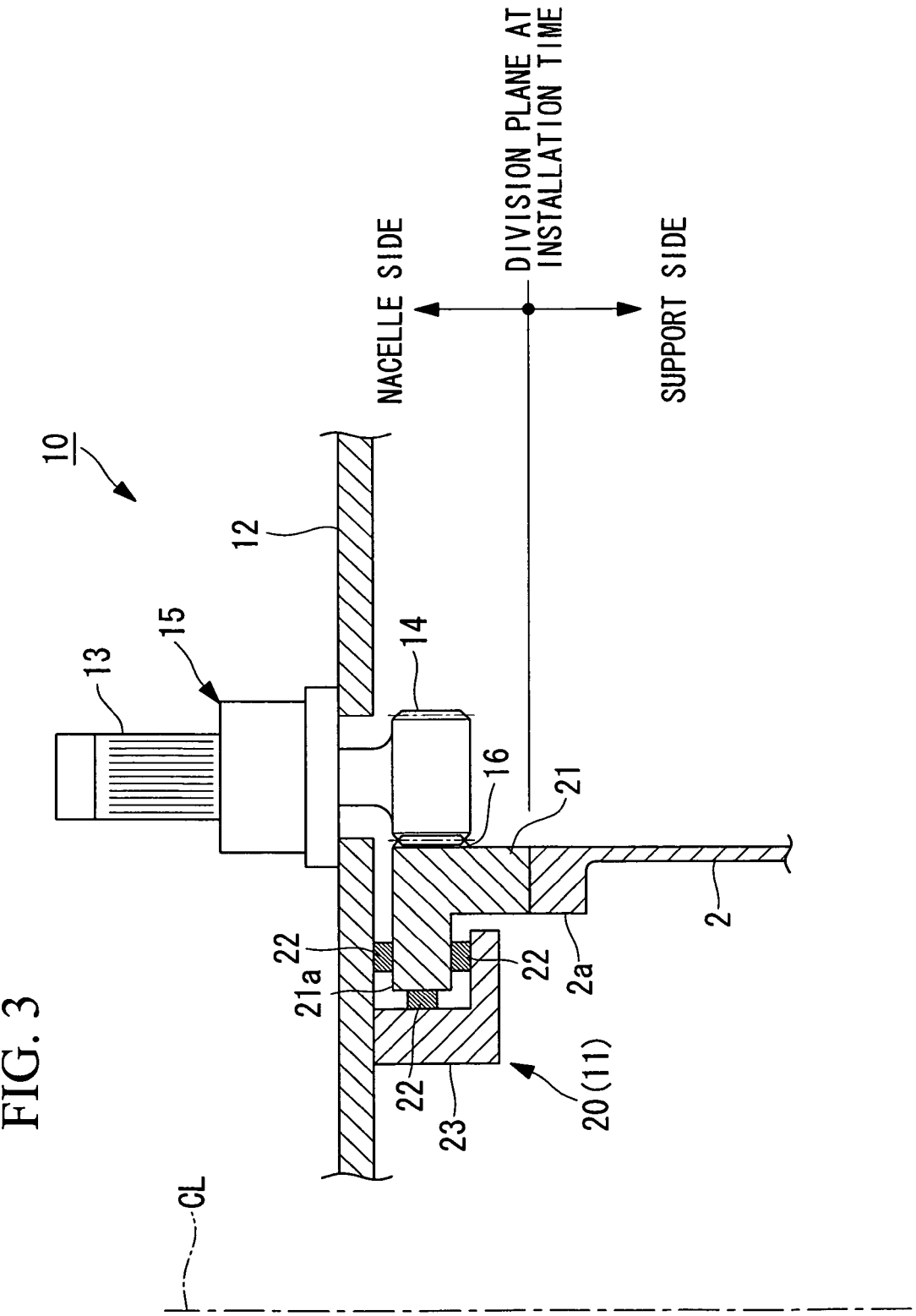
FIG. 3 is a cross-sectional view of relevant parts of a related-art example related to a yaw system of a wind turbine generator.

A wind turbine generator 1 shown in FIG. 2 includes a tower (also referred to as "tower") 2 vertically erected on a base B, a nacelle 3 mounted at the upper end of the tower 2, and a rotor head 4 provided at the nacelle 3 so as to be rotatable about the substantially horizontal axis thereof.

The rotor head 4 has a plurality of (for example, three) wind turbine blades 5 mounted radially about its rotation axis. Thus, the power of wind blowing against the wind turbine blades 5 from the direction of the rotation axis of the rotor head 4 is converted to motive power that rotates the rotor head 4 about the rotation axis.

The above-described wind turbine generator 1 is equipped with a yaw system that rotates the nacelle 3 located at the upper end of the tower 2. This yaw system is a system for pointing the nacelle 3 in an optimum direction according to the wind direction to efficiently rotate the rotor head 4, thereby generating electricity.

A yaw system 10A shown in FIG. 1 is equipped with a yaw driving unit, a yaw slew ring, and a yaw brake.

In the configuration example shown in the drawing, an inward flange 2a directed to the axial center is formed on the upper end of the tower 2 at the fixed side, and a slide bearing 20A, which has both the function of a yaw slew ring that rotatably supports the nacelle 3 rotated by a yaw driving unit 30, described below, and the function of a yaw brake that inhibits or stops the rotation of the nacelle 3, is provided using the flange 2a.

The above-described slide bearing 20A is fixed to the lower surface of the nacelle 3, specifically, to the lower surface of a nacelle base plate 12 that constitutes the nacelle 3 with a bracket 23A having a substantially L-shaped cross section disposed therebetween. Since the slide pads 22 held by the bracket 23A support (clamp) the flange 2a in a slidable manner, the slide bearing 20A functions as the yaw slew ring of the yaw system that rotates the nacelle 3 atop the tower 2. The bracket 23A is fixed at a predetermined position of the nacelle base plate 12 with bolts 24.

In the slide bearing 20A in this case, preferable slide pads 22 are made of, for example, a polymer material having a low coefficient of friction, such as polyester, polyurethane, polyamide, acetal, or polyethylene terephthalate (PET).

The above-described slide bearing 20A is disposed such that the slide pads 22 held by the bracket 23A are in contact with the upper and lower surfaces of the flange 2a and the inner circumferential surface of the flange 2a. The slide pads 22 that are in contact with the three surfaces of the flange 2a individually have appropriate pressures applied thereto in advance. As a result, frictional force acts between the slide pads 22 and the flange 2a, so that the slide bearing 20A functions also as a yaw brake that applies a constant-load braking force to the rotation of the nacelle 3.

For the above-described pressure, known pressure applying means should be adopted; for example, applying pressure to the slide pads 22 with a hydraulic cylinder (not shown) or the like to push them against the sliding surfaces.

The yaw driving unit 30 in this case is fixed at the rotating nacelle 3 side. Specifically, an electric motor 31 is fixed to the nacelle base plate 12, and an output shaft 31a thereof is substantially aligned with the axial center position of the tower 2. In other words, the output shaft 31a of the electric motor 31 is located at a yaw-slew center position that is substantially aligned with the axial center position of the above-described slide bearing 20A. The electric motor 31 may have, in its interior, a clutch, a damper, and/or a brake (not shown).

The output shaft of the electric motor 31 is connected to an inner flange 2b of the tower 2 at the fixed side, at the yaw-slew center position, with a connecting shaft 33 having a pair of couplings 32 at the upper and lower ends. The couplings 32 used here are not particularly limited, provided that they allow axial offset generated between the axial center position of the inner flange 2b and the axial center position of the yaw driving unit 30 and allow rotation of the nacelle 3 relative to the inner flange 2a.

When mounting the bracket 23A at the upper end of the tower 2 where the flange 2a is provided inwardly, it is difficult to mount the bracket 23A having a ring-like single-piece structure by inserting it through the opening at the upper end. In particular, after mounting the inner flange 2b, it is also impossible to mount it by inserting it from the lower end of the tower 2.

Accordingly, it is preferable that the above-described bracket 23A be circumferentially divided into a plurality of portions. Such a structure allows the bracket 23A divided into the plurality of portions to be inserted into the upper end of the tower 2 where the inward flange 2a is provided and to be fixed at a predetermined position.

It is also preferable that the bracket 23A with the above-described divided structure have a temporary fixing member 25 that temporarily fixes it to the upper end of the tower 2 so as not to move due to unnecessary sliding because of the presence of the slide pads 22 until mounting work to tighten the bolts 24 to predetermined positions of the nacelle base plate 12 is completed, for example, during transportation from a factory to a construction site, or during construction.

The temporary fixing member 25 is a plate-like member shaped like, for example, a donut, which is fixed to the bracket 23A using bolt holes in which the bolts 24 are tightened to thereby apply pressure to the flange 2a and the slide pads 22 so as to clamp them, thereby preventing unnecessary sliding.

In this way, the wind turbine generator 1 of the present invention is equipped with the yaw system 10A that includes the yaw driving unit, the yaw slew ring, and the yaw brake and that rotates the nacelle 3 disposed on the top of the tower 2 in accordance with the wind direction; in this case, the slide bearing 20A that is fixed to the lower surface of the nacelle 3 with the substantially L-shaped-cross-section bracket 23A functions as the yaw slew ring.

Since the slide bearing 20A slidably supports the flange 2a formed at the upper end of the tower 2 by means of the slide pads 22 held by the bracket 23A, it also functions as the yaw slew ring that also functions as the yaw brake by effectively using the flange 2a.

Thus, according to the above-described present invention, since the slide bearing 20A is configured by effectively using the flange 2a formed at the upper end of the tower 2, weight reduction can be achieved by reducing the number of components of the slide bearing 20A itself, specifically, by eliminating the fixed washer 21 and mounting bolts thereof of the conventional structure.

Furthermore, for the functions of the yaw slew ring and the yaw brake, which were conventionally separate structures, the slide bearing 20A configured using (sharing) the flange 2a of the tower 2 serves as both of them. Therefore, the number of components can be reduced also for the entire yaw system that is mounted atop the tower 2 and that rotates the nacelle 3, thus allowing weight reduction and reduced costs.

The weight reduction of the upper structure of the tower 2 also has the advantage of reducing the load on the tower 2 and the base B and the load on a crane necessary for construction.

The present invention is not limited to the above-described embodiment; various modifications can be made as appropriate without departing from the spirit thereof.

The invention claimed is:

1. A wind turbine generator that is equipped with a yaw system including a yaw driving unit, a yaw slew ring, and a yaw brake and that rotates a nacelle mounted on the top of a tower in accordance with the wind direction, wherein
    the yaw slew ring is a slide bearing fixed to the lower surface of the nacelle with a substantially L-shaped-cross-section bracket; and
    the slide bearing is configured to slidably support a flange formed at the upper end of the tower with slide pads held by the bracket.

2. The wind turbine generator according to claim 1, wherein the bracket is divided into a plurality of portions in the circumferential direction.

3. The wind turbine generator according to claim 2, comprising a temporary fixing member that temporarily holds the bracket at the upper end of the tower.

* * * * *